(12) United States Patent
Han et al.

(10) Patent No.: US 12,477,244 B2
(45) Date of Patent: Nov. 18, 2025

(54) DISPLAY CONTROL APPARATUS, DISPLAY CONTROL METHOD AND DISPLAY DEVICE

(71) Applicant: BOE TECHNOLOGY GROUP CO., LTD., Beijing (CN)

(72) Inventors: Peng Han, Beijing (CN); Lili Chen, Beijing (CN); Weihua Du, Beijing (CN); Huidong He, Beijing (CN); Qianwen Jiang, Beijing (CN); Ruifeng Qin, Beijing (CN); Juanjuan Shi, Beijing (CN); Hao Zhang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/247,442

(22) PCT Filed: Jun. 29, 2022

(86) PCT No.: PCT/CN2022/102296
§ 371 (c)(1),
(2) Date: Mar. 30, 2023

(87) PCT Pub. No.: WO2024/000251
PCT Pub. Date: Jan. 4, 2024

(65) Prior Publication Data
US 2024/0365019 A1    Oct. 31, 2024

(51) Int. Cl.
*H04N 1/60* (2006.01)
*G06T 5/70* (2024.01)
(Continued)

(52) U.S. Cl.
CPC ............ *H04N 25/683* (2023.01); *G06T 5/70* (2024.01); *H04N 1/60* (2013.01); *H04N 9/73* (2013.01);
(Continued)

(58) Field of Classification Search
CPC ................... H04N 1/60; H04N 23/80–88
(Continued)

(56) References Cited

U.S. PATENT DOCUMENTS 8,963,826 B2 * 2/2015 Oda ..................... G09G 3/32
345/102
2012/0194519 A1   8/2012 Bissell et al.
(Continued)

FOREIGN PATENT DOCUMENTS

CN    109672892 A    4/2019
CN    110971909 A    4/2020
(Continued)

*Primary Examiner* — Anthony J Daniels
(74) *Attorney, Agent, or Firm* — McCoy Russell LLP

(57) ABSTRACT

Display control apparatus, display control method and display device are provided, belonging to the field of displaying. The apparatus includes: Mini ISP module configured to obtain original image data of camera sensing component in real time, to obtain first image data by performing lens correction, defective pixel correction, noise filtering and format conversion on the original image data; compensation ISP module, configured to obtain second image data by performing lens correction, defective pixel correction, noise filtering, format conversion and first processing on the original image data; display control module, configured to process the first image data to obtain image data for displaying before receiving the second image data, to process the second image data to obtain image data for displaying after receiving the second image data and to control display screen to display according to the image data for displaying. The delay in image data transmission can be reduced.

20 Claims, 5 Drawing Sheets

(51) Int. Cl.
   *H04N 9/73*     (2023.01)
   *H04N 23/81*    (2023.01)
   *H04N 23/84*    (2023.01)
   *H04N 23/88*    (2023.01)
   *H04N 25/61*    (2023.01)
   *H04N 25/63*    (2023.01)
   *H04N 25/683*   (2023.01)

(52) U.S. Cl.
   CPC ........... *H04N 23/81* (2023.01); *H04N 23/843* (2023.01); *H04N 23/88* (2023.01); *H04N 25/61* (2023.01); *H04N 25/63* (2023.01)

(58) Field of Classification Search
   USPC ....................................................... 348/221.1
   See application file for complete search history.

(56) References Cited

U.S. PATENT DOCUMENTS

| | | | |
|---|---|---|---|
| 2013/0258136 A1* | 10/2013 | Lee | H04N 1/2145 348/231.99 |
| 2016/0309140 A1 | 10/2016 | Wang et al. | |
| 2018/0061307 A1* | 3/2018 | Inoue | G09G 3/2096 |
| 2018/0304151 A1 | 10/2018 | Hicks et al. | |
| 2019/0076007 A1* | 3/2019 | Higashiyama | A61B 1/00186 |
| 2021/0125304 A1* | 4/2021 | Terree | H04N 19/85 |
| 2021/0144335 A1 | 5/2021 | Pang | |
| 2022/0060669 A1 | 2/2022 | Komiyama | |
| 2023/0139034 A1* | 5/2023 | Yoshida | H04N 23/661 348/222.1 |
| 2023/0319395 A1* | 10/2023 | Qi | G06F 1/325 348/222.1 |
| 2024/0031672 A1* | 1/2024 | Rao | H04N 23/665 |

FOREIGN PATENT DOCUMENTS

| | | |
|---|---|---|
| CN | 110996120 A | 4/2020 |
| CN | 112804435 A | 5/2021 |
| CN | 114095710 A | 2/2022 |
| CN | 114283755 A | 4/2022 |
| CN | 114339045 A | 4/2022 |
| JP | H1079913 A | 3/1998 |
| JP | 2019080261 A | 5/2019 |
| WO | 2019178666 A1 | 9/2019 |

* cited by examiner

DISPLAY CONTROL APPARATUS, DISPLAY CONTROL METHOD AND DISPLAY DEVICE

CROSS REFERENCE TO RELATED APPLICATION

The present application is the U.S. national phase of PCT Application No. PCT/CN2022/102296 filed on Jun. 29, 2022, the disclosure of which is hereby incorporated by reference in its entirety.

TECHNICAL FIELD

The present disclosure relates to the field of display technology, and particularly to a display control apparatus, a display control method and a display device.

BACKGROUND

With the continuous development of intelligent technology, there are a variety of simulation technologies for human senses, including vision, hearing, taste, touch, and the like, the human vision is the first demand of human. In the field of intelligent hardware, camera sensors function as human eyes, machines such as robots, unmanned aircraft rely on the camera sensor to act as their eyes. In addition, the camera sensor can also obtain scene information of places which cannot be seen by the human eyes, which is an extension of human vision. However, in the current technology, there is a great delay in image information obtained by the camera sensor when being viewed by the human eyes, and real-time images obtained through the camera sensor are images that is two or more frames before what should be viewed by the human eyes. This cannot meet the requirements in many application fields, such as the vehicles and sighting devices.

SUMMARY

The present disclosure is to provide a display control apparatus, a display control method and a display device, which can reduce the time delay during image data transmission.

To achieve this, embodiments of the present disclosure provide the following technical solutions.

In one aspect, a display control module is provided, including:
a Mini image signal processing ISP module, configured to obtain original image data of a camera sensing component in real time, to obtain first image data by performing a lens correction, a defective pixel correction, a noise filtering and a format conversion on the original image data, and to send the first image data to a display control module;
a compensation ISP module, configured to obtain second image data by performing a lens correction, a defective pixel correction, a noise filtering, a format conversion and a first processing step on the original image data, and to send the second image data to the display control module; and
the display control module, configured to process the first image data to obtain image data for displaying before receiving the second image data, to process the second image data to obtain image data for displaying after receiving the second image data, and to control a display screen to display according to the image data for displaying;
wherein the first processing step includes at least one of: a black level compensation, a color interpolation, a Bayer noise filtering, a white balance correction, a color correction, a gamma correction, a color space conversion, a color noise filtering and edge enhancement in YUV color space, a color and contrast enhancement, or an automatic exposure control.

In some embodiments, the compensation ISP module is further configured to obtain a calculation result which is obtained after the lens correction is performed by the Mini ISP module on the original image data, a calculation result which is obtained after the defective pixel correction is performed by the Mini ISP module, a calculation result which is obtained after the noise filtering is performed by the Mini ISP module and/or a calculation result which is obtained after the format conversion is performed by the Mini ISP module, and obtaining the second image data according to the calculation results.

In some embodiments, the Mini ISP module includes:
a lens correction chip, configured to perform the lens correction on the original image data;
a defective pixel correction chip, configured to perform the defective pixel correction on the original image data;
a noise filtering chip, configured to perform the noise filtering on the original image data; and
a format conversion chip, configured to perform the format conversion on the original image data.

In some embodiments, the display control module includes:
a data decoding module, configured to decode the first image data or the second image data;
an image processing module, configured to process the decoded image data to obtain image data for displaying, wherein the image data for displaying matches a display mode of the display screen;
an interaction control module, configured to obtain control information input by a user and to control an operation parameter of the image processing module according to the control information;
a camera sensor control module, configured to control an operation parameter of the camera sensing component;
a time sequence control module, configured to generate a driving time sequence for gate line, a gating control signal for data line and a data voltage supply control signal according to the image data for displaying, to supply the driving time sequence for gate line to a gate scanning module, to supply the gating control signal for data line to a gating circuit, and to supply the data voltage supply control signal to a data voltage supply circuit;
the gate scanning module, configured to supply corresponding gate driving signals to a plurality of rows of gate lines of the display screen according to the driving time sequence for gate line;
the data voltage supply circuit, configured to supply a data voltage to a corresponding column of data line under the control of the data voltage supply control signal; and
the gating circuit, configured to control a connection between the corresponding column of data line and a data voltage receiving end of a corresponding column pixel circuit according to the gating control signal for data line, for supplying the data voltage to the corresponding column pixel circuit via the corresponding column of data line.

In some embodiments, the data decoding module, the image processing module, the interaction control module, the camera sensor control module, the time sequence control module, the gate scanning module, the data voltage supply circuit and the gating circuit are connected via a bus.

In some embodiments, the display control apparatus further includes:
  an image data transmission module, configured to transmit the first image data output by the Mini ISP module or the second image data output by the compensation ISP module to an external processor, and to receive processed data returned by the processor, wherein the processed data is obtained after a specific processing is performed by the processor on the first image data or the second image data, and the specific processing comprises: an image partition and/or a target object recognition.

In some embodiments, the original image data is an analog signal, and the display control apparatus further includes:
  an analog-to-digital converter, configured to convert the analog signal of the original image data into a digital signal and then deliver the digital signal to the Mini ISP module and the compensation ISP module.

In some embodiments, the display control apparatus further includes:
  a memory module, configured to store the original image data.

The compensation ISP module is further configured to obtain the original image data from the memory module.

In some embodiments, the Mini ISP module, the compensation ISP module and the display control module are included in a control processing chip based on a RISC-V architecture.

Embodiments of the present disclosure also provide a display device, including a display control apparatus as described above, the display device further includes a display screen, and the display screen includes a plurality of rows of pixel circuits and a plurality of columns of pixel circuits, a plurality of rows of gate lines and a plurality of columns of data lines.

Embodiments of the present disclosure also provide a display control method, applied to the display control apparatus as described above, including:
  obtaining, by a Mini image signal processing ISP module, original image data of a camera sensing component in real time, obtaining first image data by performing a lens correction, a defective pixel correction, a noise filtering and a format conversion on the original image data, and sending the first image data to a display control module;
  obtaining, by a compensation ISP module, second image data by performing a lens correction, a defective pixel correction, a noise filtering, a format conversion and a first processing step on the original image data, and sending the second image data to the display control module; and
  processing, by a display control module, the first image data to obtain image data for displaying before receiving the second image data, processing the second image data to obtain image data for displaying after receiving the second image data, and controlling a display screen to display according to the image data for displaying;
  wherein the first processing step includes at least one of: a black level compensation, a color interpolation, a Bayer noise filtering, a white balance correction, a color correction, a gamma correction, a color space conversion, a color noise filtering and edge enhancement in YUV color space, a color and contrast enhancement, or an automatic exposure control.

In some embodiments, the obtaining second image data includes:
  obtaining, by the compensation ISP module, a calculation result which is obtained after the lens correction is performed by the Mini ISP module on the original image data, a calculation result which is obtained after the defective pixel correction is performed by the Mini ISP module, a calculation result which is obtained after the noise filtering is performed by the Mini ISP module and/or a calculation result which is obtained after the format conversion is performed by the Mini ISP module, and obtaining the second image data according to the calculation results.

In some embodiments, the obtaining first image data includes:
  performing, by a lens correction chip, the lens correction on the original image data;
  performing, by a defective pixel correction chip, the defective pixel correction on the original image data;
  performing, by a noise filtering chip, the noise filtering on the original image data; and
  performing, by a format conversion chip, the format conversion on the original image data.

In some embodiments, the controlling a display screen to display according to the image data for displaying includes:
  generating, by a time sequence control module, a driving time sequence for gate line, a gating control signal for data line and a data voltage supply control signal according to the image data for displaying, supplying the driving time sequence for gate line to a gate scanning module, supplying the gating control signal for data line to a gating circuit, and supplying the data voltage supply control signal to a data voltage supply circuit;
  supplying, by the gate scanning module according to the driving time sequence for gate line, corresponding gate driving signals to a plurality of rows of gate lines of the display screen;
  supplying, by the data voltage supply circuit under the control of the data voltage supply control signal, a data voltage to a corresponding column of data line;
  controlling, by the gating circuit according to the gating control signal for data line, a connection between a corresponding column of data line and a data voltage receiving end of a corresponding column pixel circuit, for supplying the data voltage to the corresponding column pixel circuit via the corresponding column of data line.

In some embodiments, the method further includes:
  transmitting, by an image data transmission module, first image data output by the Mini ISP module or second image data output by the compensation ISP module to an external processor, and receiving processed data returned by the processor, wherein the processed data is obtained after a specific processing is performed by the processor on the first image data or the second image data, and the specific processing comprises: an image partition and/or a target object recognition.

In some embodiments, the method further includes:
  converting, by an analog-to-digital converter, an analog signal of the original image data into a digital signal, and delivering the digital signal to the Mini ISP module and the compensation ISP module.

In some embodiments, the method further includes:

storing, by a memory module, the original image data; and obtaining, by the compensation ISP module, the original image data from the memory module.

Embodiments of the present disclosure have the following beneficial effects.

In the above-mentioned solution, the original image data of the camera sensing component is directly transmitted to the Mini ISP module for image processing, such that the elapsed time when the original image data have been transmitted to the display control module can be reduced. In addition, functions of an ISP module are simplified to obtain the Mini ISP module, which only keeps four functions consist of the lens correction, the defective pixel correction, the noise filtering and the format conversion, thus ensuring the basic display effect and reducing the delay of image processing. Moreover, in order to ensure the display effect, the compensation ISP module is also provided, and the compensation ISP module can further process the image data on the basis of the four functions consist of the lens correction, the defective pixel correction, the noise filtering and the format conversion, so as to improve the display effect. Before the image data processing is completed by the compensation ISP module, the image data of the Mini ISP module is used for displaying, and after the image data processing is completed by the compensation ISP module, the image data of the compensation ISP module is used for displaying. In this way, the delay of image processing can be reduced without influencing visual experience of a user.

BRIEF DESCRIPTION OF THE DRAWINGS

The accompanying drawings provide a further understanding of the disclosure which constitute a part of the disclosure, exemplary embodiment(s) of the disclosure and the description thereof are for the purpose of explaining the disclosure and do not constitute an undue limitation on the disclosure.

DETAILED DESCRIPTION

Hereinafter, a clear description for the technical solution provided by embodiments of the present disclosure will be given in conjunction with the accompanying drawings. Obviously, the described embodiments are only some, rather than all, of the embodiments of the present disclosure. Based on the embodiments in this disclosure, all other embodiments obtained by those skilled in the art without any creative effort fall within the protection scope of this disclosure.

Currently, the camera can functions as an extension of human eyes to obtain scene information where the human eyes cannot see. However, in the related art, image information obtained by the camera has a great delay when being viewed by the human eyes. That is to say, real-time images obtained through the camera, when being viewed by the human eyes, are all images delayed by two or more frames. Thus, this cannot meet the requirement in many application fields, such as the field of sighting device which functions as human eyes on firearms. An experienced sniper needs very rich experiences to be able to have one hundred percent shooting accuracy, while an ordinary sniper is difficult to have such high shooting accuracy by means of a conventional sighting device. As a result, there is a need for an intelligent digital sighting device, which can help to calculate the air temperature and humidity, wind direction, wind force, trajectory parameters, and the like. However, in the existing scheme for image transmission, the image will be subject to various processing from the capturing end to the display end, and thus there is a minimum of 2 or more frames of delay. That is to say, the image seen by the user is actually the image information two frames before the real time image information, which is disadvantageous to the accurate shooting and even may lead to misfire. Similarly, in the field of mixed reality MR, after wearing a virtual reality VR helmet, the user observes external information via the camera, and obtains an external image via the camera. Afterwards, a virtual rendering is performed. A long delay of obtaining an image may cause a delay in the information obtained by the human eye, which may result in a poor user experience effect, and may even produce a sensory discomfort or vertigo feeling due to tis difference with real time information.

Embodiments of the present disclosure provide a display control apparatus, a display control method and a display device, which can reduce a time delay during image data transmission.

Figure 1:
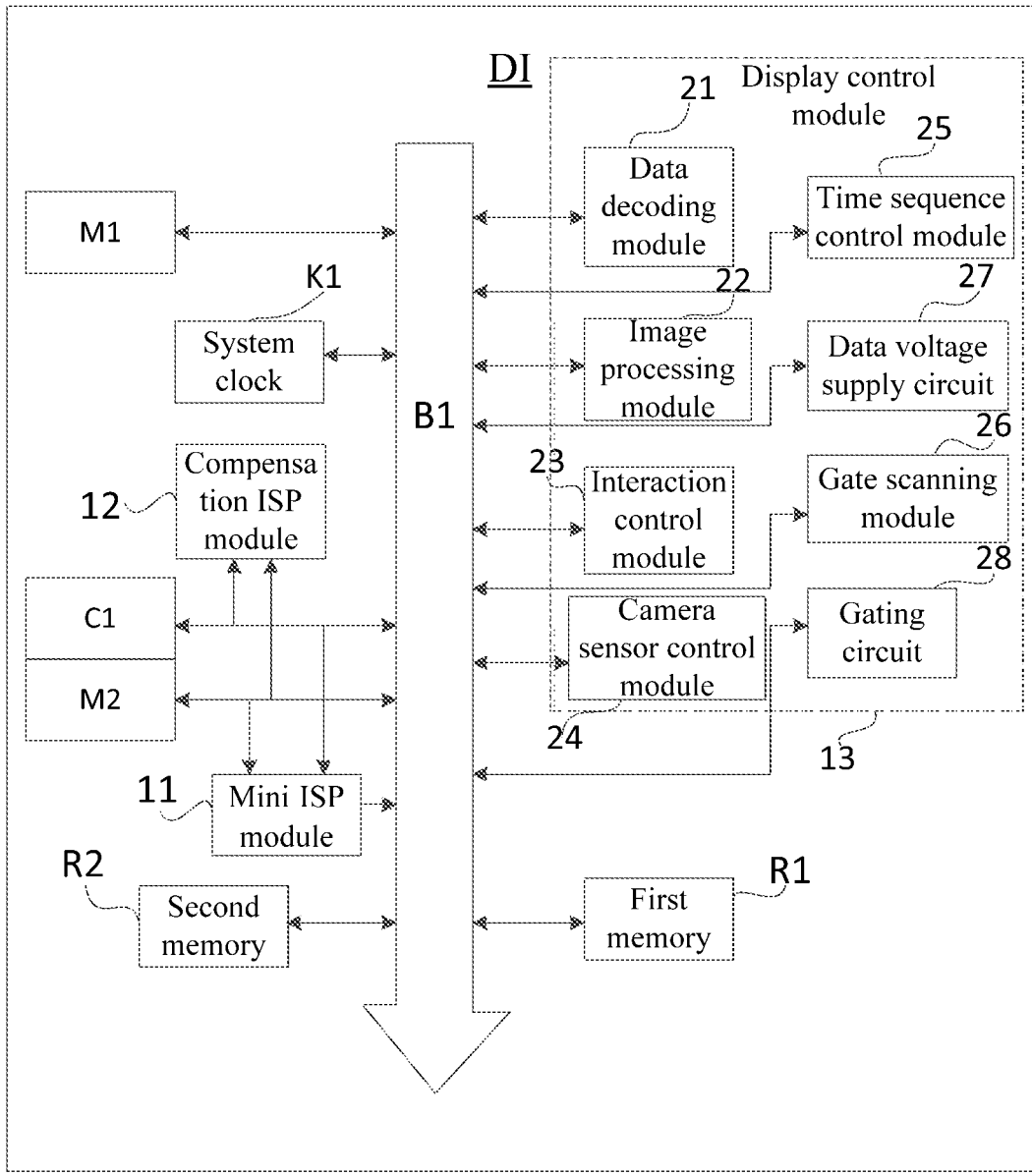
FIG. 1 is a schematic diagram showing an architecture of a display control apparatus according to an embodiment of the present disclosure.

An embodiment of the present disclosure provides a display control apparatus, as shown in FIG. 1, the display control apparatus includes:

a Mini (micro) ISP (image signal processing) module 11, configured to obtain original image data of a camera sensing component in real time, to obtaining first image data by performing a lens correction, a defective pixel correction, a noise filtering and a format conversion on the original image data, and to send the first image data to a display control module;

a compensation ISP module 12, configured to obtain second image data by performing a lens correction, a defective pixel correction, a noise filtering, a format conversion and a first processing step on the original image data, and to send the second image data to the display control module; and a display control module 13, configured to process the first image data to obtain image data for displaying before receiving the second image data, and to process the second image data to obtain image data for displaying after receiving the second image data, and to control a display screen to display according to the image data for displaying.

The first processing step includes at least one of:

a black level compensation, a color interpolation, a Bayer noise filtering, a white balance correction, a color correction, a gamma correction, a color space conversion, a color noise filtering and edge enhancement in YUV color space, a color and contrast enhancement, or an automatic exposure control.

In the related art, after the camera sensing component obtains the original image data, a preliminarily process is performed on the original image data and then the processed original image data is transmitted to the display control apparatus. As a result, it takes a certain time when the original image data is transmitted to the display control apparatus. In addition, the display control apparatus needs to perform the following processing steps before obtaining the image data used for displaying: the black level compensation, the lens correction, the defective pixel correction, the color interpolation, the Bayer (Bayer is an original image inside a camera, with "raw" as its suffix in general) noise filtering, the white balance (AWB) correction, the color correction, the gamma (gamma) correction, the color space conversion (RGB converted to YUV) on the image data, and the color noise filtering and edge enhancement on the YUV (Y is the grey scale, and U and V represent the chroma of color) color space, the color and contrast enhancement, the automatic exposure control and the like. The processing time is long, such that the real-time images obtained through the camera sensor are all images delayed with 2 or more frames when being viewed by human eyes.

In the embodiment, the original image data of the camera sensing component is directly transmitted to the Mini ISP module for image processing, such that the elapsed time when the original image data have been transmitted to the display control apparatus can be reduced. In addition, functions of an ISP module are simplified to obtain the Mini ISP module, which only keeps four functions consist of the lens correction, the defective pixel correction, the noise filtering and the format conversion, thus ensuring the basic display effect and reducing the delay of image processing. Moreover, in order to ensure the display effect, the compensation ISP module is also provided, and the compensation ISP module can further process the image data on the basis of the four functions consist of the lens correction, the defective pixel correction, the noise filtering and the format conversion, so as to improve the display effect. Before the image data processing is completed by the compensation ISP module, the image data of the Mini ISP module is used for displaying, and after the image data processing is completed by the compensation ISP module, the image data of the compensation ISP module is used for displaying. In this way, the delay of image processing can be reduced without influencing visual experience of the user.

Figure 2:
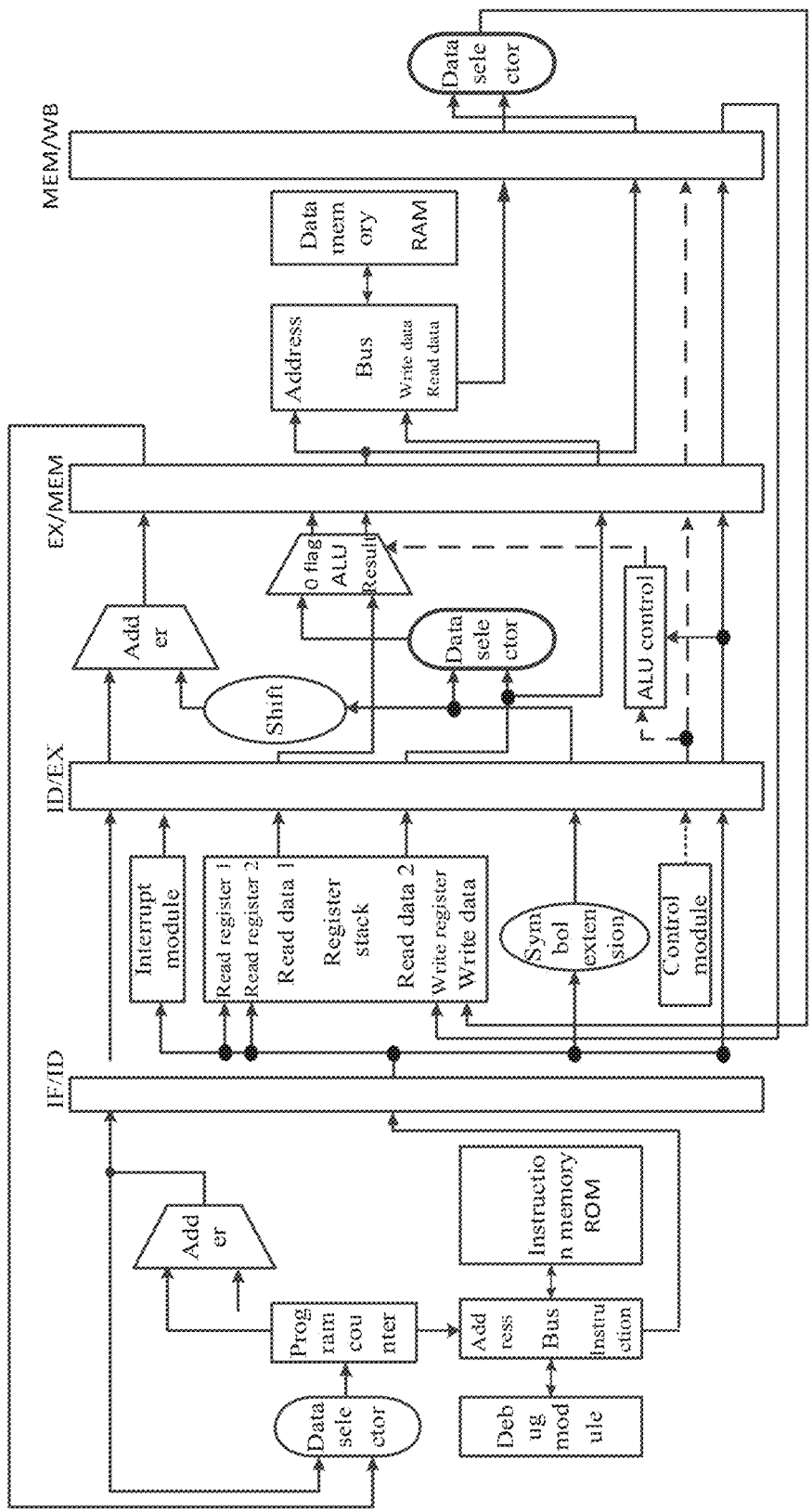
FIG. 2 is a diagram showing a micro-architecture of a processor in a display control apparatus according to at least one embodiment of the present disclosure.

In the embodiment, the Mini ISP module, the compensation ISP module and the display control module are contained in a display driving integrated circuit (DI); the display driving integrated circuit DI can be a control processing chip based on a RISC-V (the RISC-V is an open source instruction set architecture (ISA) based on a reduced instruction set (RISC) principle compared with other instruction sets) architecture, which is referred to as a RIDI chip, but is not limited thereto. The basic hardware frame diagram is shown in FIG. 1. The core control in the architecture is the CPU micro inner core based on the RISC-V architecture, which is also the core of the whole Driver IC. This core is responsible for allocating resources in the IC. This micro inner core design can adopt a general 5-stage pipeline architecture. As shown in FIG. 2, a diagram showing the architecture of the 5-stage pipeline CPU micro inner core based on the RISC-V architecture is provided.

In FIG. 2, IF is the first stage pipeline, ID is the second stage pipeline, EX is the third stage pipeline, MEM is the fourth stage pipeline, and WB is the fifth stage pipeline.

In FIG. 2, ALU is an arithmetic logic unit, RAM is a random access memory, and ROM is a read-only memory.

In a related scheme for image processing, after the camera sensing component obtains original image data, an analog-to-digital conversion and/or an image data processing is performed on the original image data to generate RGB or YUV data. Said data is transmitted to the display control apparatus, and the display control apparatus performs a display enhancement processing on the received image data and then uses same for displaying, or converts the received image data into required display data for a direct displaying. There may be various software and hardware processing flows in the whole data link, resulting in a long transmission time and affecting the sensory experience.

In the embodiment, in addition to the common camera interface (Camera link interface, MIPI CSI interface), the display control apparatus may also include an analog data interface, which can directly receive the original image data obtained by the camera sensing component. In other words, the data obtained after the exposure of the camera sensor can be directly transmitted to the display control apparatus without any processing, for processing by the display control apparatus. In this way, the data source end can be simplified greatly, and the time delay of the image data can be further reduced.

In some embodiments, the original image data is an analog signal, and the display control apparatus further includes:
an analog-to-digital converter, configured to convert the analog signal of the original image data into a digital signal and then deliver the digital signal to the Mini ISP module and the compensation ISP module.

In the embodiment, in the Mini ISP module, only the four functions, i.e., the lens correction, the defective pixel correction, the noise filtering and the format conversion, are kept, which can reduce the time of processing image data. In addition, these four functions of the lens correction, the defective pixel correction, the noise filtering and the format conversion can be implemented in hardware, so that the processing speed can be faster and the image processing delay can be greatly reduced.

Figure 4:
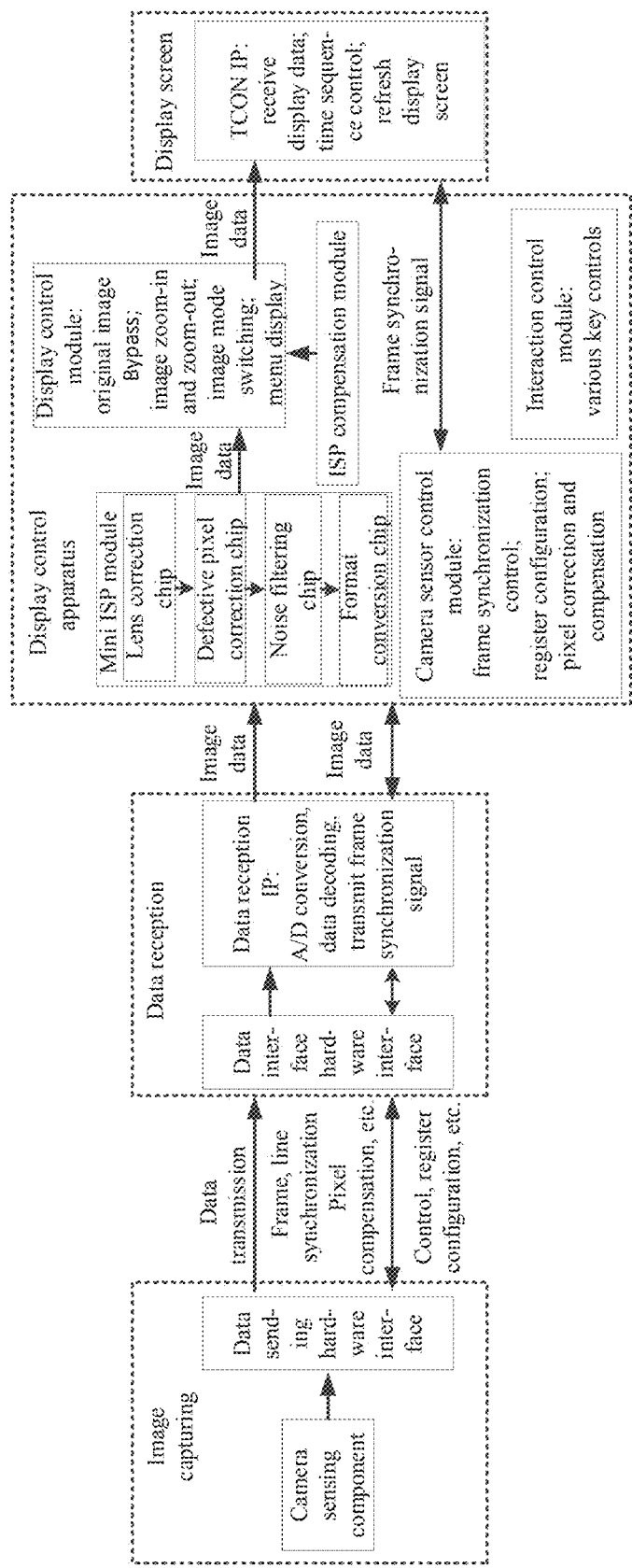
FIG. 4 is a schematic diagram showing an architecture of a display control apparatus according to an exemplary embodiment of the present disclosure.
Figure 5:
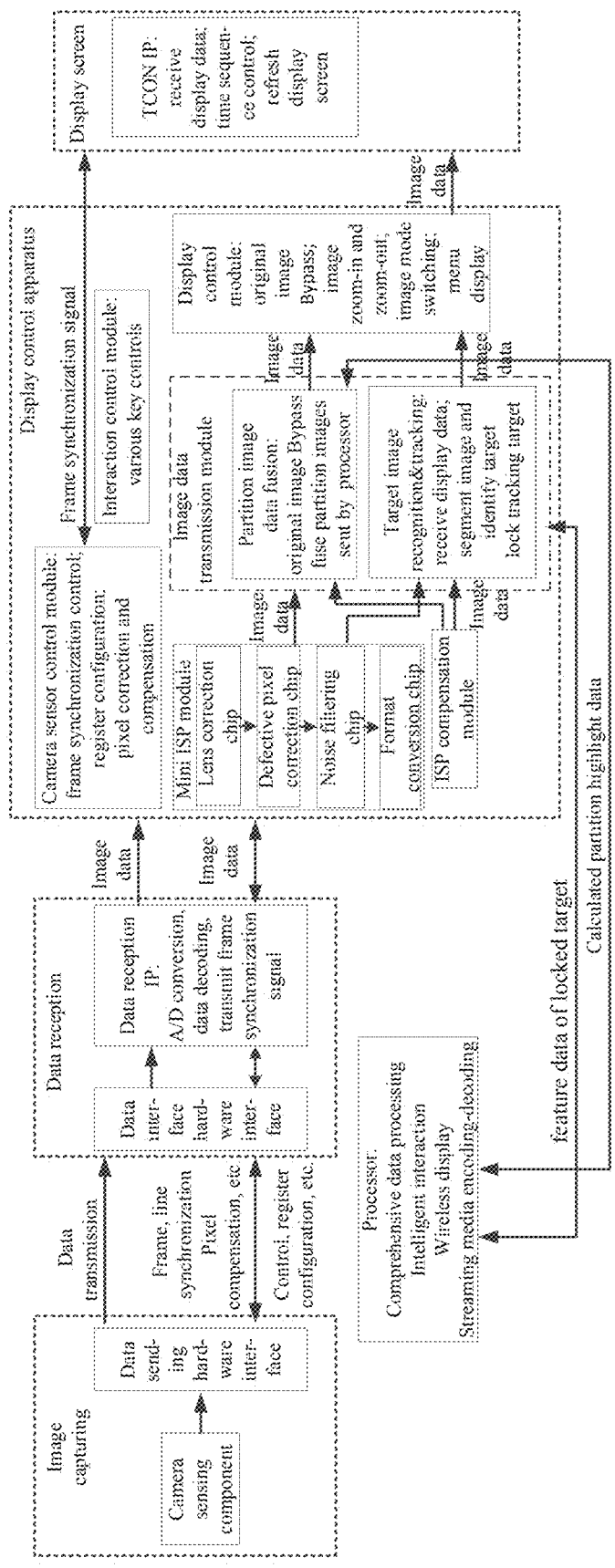
FIG. 5 is a schematic diagram showing an architecture of a display control apparatus according to another exemplary embodiment of the present disclosure.

As shown in FIGS. 4 and 5, the Mini ISP module includes:
a lens correction chip, configured to perform the lens correction on the original image data;
a defective pixel correction chip, configured to perform the defective pixel correction on the original image data;
a noise filtering chip, configured to perform the noise filtering on the original image data; and
a format conversion chip, configured to perform the format conversion on the original image data.

After being processed by the four chips, the original image data can be converted into an image data format required for displaying, and can be used as display data of the display screen after a simple image scaling (zoom in or out in proportion) is performed.

In the process of image processing, the four functions of the lens correction, the defective pixel correction, the noise filtering and the format conversion can be realized by hardware. However, some other functions cannot be realized by hardware. For example, a gamut space conversion or a distortion correction cannot be realized by hardware, while the data provided by the Mini ISP module cannot meet requirements of all the application scenarios. For example, in the application scenario of digital sighting device, the data provided by the Mini ISP module is sufficient for being used by the sniper to see and lock the target for use in this apparatus scenario. However, in some other application scenarios, such as viewing-sighting device, monitoring, there is a higher requirement for image detail and quality, and the data provided by the Mini ISP module cannot meet the requirement of these application scenarios. Therefore, in the embodiment, the display control apparatus further includes the compensation ISP module, and the compensation ISP module not only has four functions of the lens correction, the defective pixel correction, the noise filtering and the format conversion, but also has other function(s). The image processing may include, but is not limited to, the following: the black level compensation, the lens correction, the defective pixel correction, the color interpolation, the Bayer (Bayer is an original image inside a camera, with "raw" as its suffix in general) noise filtering, the white balance (AWB) correction, the color correction, the gamma (gamma) correction, the color space conversion (RGB converted to YUV) on the image data, and the color noise filtering and edge enhancement on the YUV (Y is the grey scale, and U and V represent the chroma of color) color space, the color and contrast enhancement, the automatic exposure control and the like. In addition to performing steps of the lens correction, the defective pixel correction, the noise filtering and the format conversion, the compensation ISP module may also perform a first processing step such as the black level compensation, the color interpolation, the Bayer noise filtering, the white balance correction, the color correction, the gamma correction, the color space conversion, the color noise filtering and edge enhancement on the YUV color space, the color and contrast enhancement and the automatic exposure control, etc. The compensation ISP module may perform one or more first processing step(s), and the first processing step(s) required to be performed by the compensation ISP module may be determined according to the requirements of an application scenario. More first processing steps need to be performed by the compensation ISP module if there is a higher requirement for the image quality in the application scenario, and fewer first processing steps need to be performed by the compensation ISP module if there is a lower requirement for the image quality in the application scenario. In order to reduce the time taken by the compensation ISP module to perform the image processing, at least some of the first processing steps performed by the compensation ISP module may be implemented by hardware.

Furthermore, the compensation ISP module is further configured to obtain a calculation result which is obtained after the lens correction is performed by the Mini ISP module on the original image data, a calculation result which is obtained after the defective pixel correction is performed by the Mini ISP module, a calculation result which is obtained after the noise filtering is performed by the Mini ISP module and/or a calculation result which is obtained after the format conversion is performed by the Mini ISP module, and to obtain the second image data according to the calculation results. In this way, the compensation ISP module can perform the image processing by using the calculation results of the Mini ISP module, repeated calculations can be avoided while the time taken for performing the image processing by the compensation ISP module can be reduced.

Figure 3:
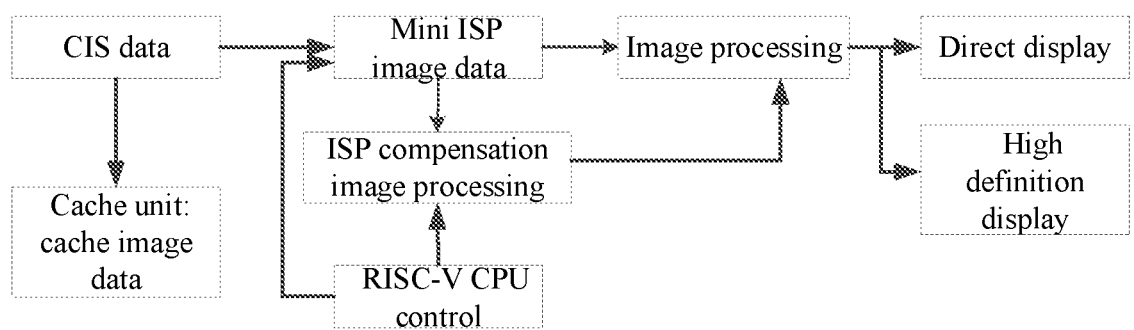
FIG. 3 is a schematic flow chart of image processing performed by a Mini ISP module and a compensation ISP module according to an embodiment of the present disclosure.

As shown in FIG. 3, the original image data of the camera sensing component will be sent to the Mini ISP module and the compensation ISP module at the same time. Since the image processing steps performed by the Mini ISP module are less than the image processing steps performed by the compensation ISP module, and the time required for the image processing at the Mini ISP module is shorter. The Mini ISP module sends the first image data to the display control module before the compensation ISP module. After receiving the first image data, the display control module processes the first image data to obtain image data for displaying, and controls the display screen to display, so that the human eye can obtain the scene information to be observed in a timely manner. After the compensation ISP module sends the second image data to the display control module, the display control module processes the second image data to obtain image data for displaying, and controls the display screen to display, so that the human eye can observe information having more details. When a human eye sees a certain scene, only rough outline or rough information about the scene is obtained at a first time, a focusing process is done by the human eye when it is desired to observe more detailed information. During the focusing process of the human eye, the compensation ISP module can use this time duration to perform high-quality image processing. After the processing of the compensation ISP module is completed, the display control module displays, by using the second image data output by the compensation ISP module, a high-definition and high-quality image information to the human eye. In this way, a low delay can be achieved without reducing the visual experience of the user, and the compensation ISP module may even have time to do more and finer image compensation treatments.

In the embodiment, the compensation ISP module may directly obtain original image data from the camera sensing component. Optionally, the display control apparatus further includes a memory module, configured to store the original image data. The memory module can be a RAM for storage inside the display control apparatus. The original image data of the camera sensing component may be simultaneously transmitted to the Mini ISP module and the RAM for storage; and the compensation ISP module may obtain the original image data from the memory module.

In some embodiments, as shown in FIG. 1, the display control module includes:

a data decoding module 21, configured to decode the first image data or the second image data;

an image processing module 22, configured to process the decoded image data to obtain image data for displaying, wherein the image data for displaying matches a display mode of the display screen, for example, the resolution of the image data for displaying matches the resolution of the display screen;

an interaction control module 23, configured to obtain control information input by a user and controlling an operation parameter of the image processing module according to the control information, wherein the interaction between the user and the display control apparatus can be realized via a key on the display control apparatus; when the user clicks the key on the display control apparatus, the operation parameter input by the user may be received, wherein the control information input by the user can control the operation parameter of the camera sensing component and the display mode of the display screen;

a camera sensor control module 24, configured to control the operation parameter of the camera sensing component, including but not limited to the exposure mode, row and column scanning mode and the like of the camera sensing component;

a time sequence control module 25, configured to generate a driving time sequence for gate line, a gating control signal for data line and a data voltage supply control signal according to the image data for displaying, to supply the driving time sequence for gate line to a gate scanning module, to supply the gating control signal for data line to a gating circuit, and to supply the data voltage supply control signal to a data voltage supply circuit;

the gate scanning module 26, configured to supply corresponding gate driving signals to rows of gate lines of the display screen according to the gate scanning time sequence;

the data voltage supply circuit 27, configured to supply a data voltage to a corresponding column of data line under the control of the data voltage supply control signal; and the gating circuit 28, configured to control a connection between a corresponding column of data line and a data voltage receiving end of the corresponding column pixel circuit according to the gating control signal for data line, for supplying the data voltage to the corresponding column pixel circuit via the corresponding column of data line.

The display screen includes rows and columns of pixel circuits, rows of gate lines and columns of data lines. The display screen further includes a plurality of transistors, a gate electrode of a transistor may be connected to a gate line, and a first electrode or a second electrode of the transistor may be connected to the data line. When controlling the display screen to display, the gate scanning module supplies a corresponding gate driving signal to a gate line according to the gate scanning time sequence, so as to control the gate line for switching on successively, and the data voltage supply circuit supplies a data voltage to a corresponding column of data line under the control of the data voltage supply control signal. The gating circuit controls the connection between the corresponding column of data line and the data voltage receiving end of the corresponding column pixel circuit according to the gating control signal for data line, for supplying the data voltage to the corresponding column pixel circuit via the corresponding column of data line. Specifically, during display time for a frame of image, the rows of gate lines included in the display screen are sequentially used for switching on.

In some embodiments, as shown in FIG. 1, the data decoding module 21, the image processing module 22, the interaction control module 23, the camera sensor control module 24, the time sequence control module 25, the gate scanning module 26, the data voltage supply circuit 27 and the gating circuit 28 are connected via a bus.

The data decoding module 21 may transmit decoded image data to the image processing module 22 via the bus, and the interaction control module 23 may transmit a control instruction input by a user to the camera sensor control module 24 via the bus. The image processing module 22 may transmit the image data for displaying to the time sequence control module 25 via the bus. The time sequence control module 25 may transmit the driving time sequence for gate line to the gate scanning module 26 via the bus, transmit the gating control signal for data line to the gating circuit 28 via the bus, and transmit the data voltage supply control signal to the data voltage supply circuit 27 via the bus.

As shown in FIG. 1, the display control apparatus according to at least one embodiment of the present disclosure further includes a system clock K1, a first interface M1, a second interface M2 and a third interface C1, a first memory R1 and a second memory R2.

The system clock K1, the first interface M1, the second interface M2, the third interface C1, the first memory R1 and the second memory R2 may be contained in the display driving integrated circuit DI.

The first interface M1 may be a MIPI (Mobile Industry Processor Interface) (Display Serial Interface) interface.

The first interface M1 may be electrically connected to a display data source (not shown in FIG. 1, and the display data source is provided outside the display driving integrated circuit DI), and the first interface M1 is configured for receiving image information to be displayed from the display data source and providing the image information to be displayed to the data decoding module 11 via the bus B1.

The second interface M2 may be a MIPI CSI interface (the CSI interface is a type of camera serial interface), and the third interface C1 can be a Camera Link interface.

The second interface M2 and the third interface C1 may be electrically connected to the camera sensing component (not shown in FIG. 1, and the camera sensing component is arranged outside the display driving integrated circuit DI), and may be configured for transmitting original image data provided by the camera sensor. The second interface M2 and the third interface C1 may be connected to various types of camera sensing components respectively.

The Mini ISP module is electrically connected to the second interface M2, the third interface C1 and the bus B1, and the Mini ISP module is configured for receiving the original image data, performing an image processing on the original image data to obtain processed first image data, and providing the processed first image data to the data decoding module 21 via the bus B1. The data decoding module 21 is configured for decoding the processed first image data to obtain decoded image data.

In the at least one embodiment as shown in FIG. 1, the first memory R1 may be a ROM and the second memory R2 may be a RAM. The first memory R1 and the second memory R2 may be electrically connected to the bus B1.

The system clock K1 is configured to provide a clock signal.

In at least one embodiment of the present disclosure, the display data source is disposed external to the display driving integrated circuit, the display data source may be a high definition data source, and the display data source may be used to provide high definition image information. In particular implementations, the display data source may be a processor, such as, but not limited to, a mainboard of a mobile phone.

In the at least one embodiment as shown in FIG. 1, the first memory R1 and the second memory R2 are included in a memory module.

The display control apparatus in the embodiment may also be connected to an external processor. An intelligent processing may be performed in conjunction with the external processor. One feature of the RIDI chip is using only the micro inner core of the RISC-V, and the remaining part can be added according to actual needs, which has a high flexibility. Different processors can be combined, and some of the computing tasks may be handed over to the external processor(s). The RIDI chip is only responsible for an image fusion and a target locking.

In some embodiments, as shown in FIG. 5, the display control apparatus further includes:

an image data transmission module, configured for transmitting the first image data output by the Mini ISP module or the second image data output by the compensation ISP module to an external processor, and receiving processed data returned by the processor, wherein the processed data is obtained after a specific processing is performed by the processor on the first image data or the second image data, and the specific processing includes: an image partition and/or a target object recognition.

The display control module is specifically configured for obtaining data for displaying according to the processed data.

For example, the image data transmission module may transmit the first image data output by the Mini ISP module to the external processor, and the external processor may perform comprehensive data processing on the first image data, lock feature data of a target object, and send the feature data of the target object to the display control module. Afterwards, the display control module may perform, according to the received feature data of the target object, an image segmentation, identify the target object, and lock the target object to be tracked. The image data transmission module may transmit the second image data output by the compensation ISP module to the external processor, and the external processor may perform comprehensive data processing on the second image data, lock feature data of a target object, and send the feature data of the target object to the display control module. Afterwards, the display control module may perform, according to the received feature data of the target object, an image segmentation, identify the target object, and lock the target object to be tracked.

Optionally, the image data transmission module may transmit the first image data output by the Mini ISP module to the external processor, and the external processor may perform comprehensive data processing on the first image data, calculate partition highlight data, and send the partition highlight data to the display control module. Afterwards, the display control module may fuse the partition images sent by the processor according to the received partition highlight data. The image data transmission module may transmit the second image data output by the compensation ISP module to the external processor, and the external processor may perform comprehensive data processing on the second image data, calculate partition highlight data, and send the partition highlight data to the display control module. Afterwards, the display control module may fuse the partition images sent by the processor according to the received partition highlight data.

By combining the external processor for auxiliary calculation and correction, the target can be locked as fast as possible, and the surrounding conditions of the target can be observed carefully, such that a low-latency, simple hardware design can be realized.

Embodiments of the present disclosure also provide a display device, including the display control apparatus as described above. The display device further includes a display screen, the display screen includes a plurality of rows of pixel circuits, a plurality of columns of pixel circuits, a plurality of rows of gate lines and a plurality of columns of data lines.

The display device includes, but is not limited to: a radio frequency unit, a network module, an audio output unit, an input unit, a sensor, a display unit, a user input unit, an interface unit, a memory, a processor, and a power supply. It will be appreciated by those skilled in the art that the configuration of the display device described above is not intended to be limiting and that the display device may include more or fewer of the components described above, or some combinations of the components, or different arrangements of the components. In embodiments of the present disclosure, the display device includes, but is not limited to, a display, a cell phone, a tablet, a television, a wearable electronic device, a navigation display device, and the like.

The display device may be: any product or component with a display function, such as a television, a display, a digital photo frame, a mobile phone, a tablet computer, wherein the display device further includes a flexible circuit board, a printed circuit board and a back panel.

The display device in the embodiments may be an optical sighting device or a VR helmet.

In a case that the display device is the optical sighting device, the Mini ISP module performs the lens correction, the defective pixel correction, the noise filtering and the format conversion processing on the original image data obtained by the camera sensing component to obtain first image data, wherein the first image data enables a sniper to distinguish and lock the target. At the same time, the compensation ISP module performs the following operations on the original image data obtained by the camera sensing component to obtain second image data: the black level compensation, the lens correction, the defective pixel correction, the color interpolation, the Bayer (Bayer is an original image inside a camera, with ".raw" as its suffix in general) noise filtering, the white balance (AWB) correction, the color correction, the gamma (gamma) correction, the color space conversion (RGB converted to YUV) on the image data, and the color noise filtering and edge enhancement on the YUV (Y is the grey scale, and U and V represent the chroma of color) color space, the color and contrast enhancement, the automatic exposure control and the like. The second image data can provide more details of an image and has a high quality. The first image data and the second image data are transmitted to the external processor. The external processor may assist in calculating air temperature and humidity, wind direction, wind force, trajectory parameters, and the like, and may also lock the feature data of the target object. In the embodiment, the end-to-end delay between the camera sensing component and the display screen, including various types of delays such as a transmission delay and an capturing delay, can be reduced, which enables the human eye to obtain scene information in real time, and thus can be the extension of human vision in a real sense. The display device can also assist the sniper in locking the target object, which is advantageous for shooting accuracy.

In a case that the display device is a VR helmet, the Mini ISP module performs the lens correction, the defective pixel correction, the noise filtering and the format conversion processing on the original image data obtained by the camera sensing component to obtain first image data, wherein the first image data can enable a wearer to observe scene information at a first time. At the same time, the compensation ISP module performs the following operations on the original image data obtained by the camera sensing component to obtain second image data: the black level compensation, the lens correction, the defective pixel correction, the color interpolation, the Bayer (Bayer is an original image inside a camera, with ".raw" as its suffix in general) noise filtering, the white balance (AWB) correction, the color correction, the gamma (gamma) correction, the color space conversion (RGB converted to YUV) on the image data, and the color noise filtering and edge enhancement on the YUV (Y is the grey scale, and U and V represent the chroma of color) color space, the color and contrast enhancement, the automatic exposure control and the like. The second image data can provide more details of an image and has a high quality, and thus a high-definition and high-quality image information can be presented to the wearer. In the embodiment, the end-to-end delay between the camera sensing component and the display screen, including various types of delays such as a transmission delay and an capturing delay, can be reduced, which enables the human eye to obtain scene information in real time, and thus can be the extension of human vision in a real sense. The display device can also assist the sniper in locking the target object, which is advantageous for shooting accuracy.

Embodiments of the present disclosure also provide a display control method, applied to the display control apparatus as described above, including:

obtaining, by a Mini image signal processing ISP module, original image data of a camera sensing component in real time, obtaining first image data by performing a lens correction, a defective pixel correction, a noise filtering and a format conversion on the original image data, and sending the first image data to a display control module;

obtaining, by a compensation ISP module, second image data by performing a lens correction, a defective pixel correction, a noise filtering, a format conversion and a first processing step on the original image data, and sending the second image data to the display control module; and processing, by a display control module, the first image data to obtain image data for displaying before receiving the second image data, and processing the second image data to obtain image data for displaying after receiving the second image data; controlling a display screen to display according to the image data for displaying;

wherein the first processing step includes at least one of:

a black level compensation, a color interpolation, a Bayer noise filtering, a white balance correction, a color correction, a gamma correction, a color space conversion, a color noise filtering and edge enhancement in YUV color space, a color and contrast enhancement, or an automatic exposure control.

In the related art, after the camera sensing component obtains the original image data, a preliminarily process is performed on the original image data and then the processed original image data is transmitted to the display control apparatus. As a result, it takes a certain time when the original image data is transmitted to the display control apparatus. In addition, the display control apparatus needs to perform the following processing steps before obtaining the image data used for displaying: the black level compensation, the lens correction, the defective pixel correction, the color interpolation, the Bayer (Bayer is an original image inside a camera, with ".raw" as its suffix in general) noise filtering, the white balance (AWB) correction, the color correction, the gamma (gamma) correction, the color space conversion (RGB converted to YUV) on the image data, and the color noise filtering and edge enhancement on the YUV (Y is the grey scale, and U and V represent the chroma of color) color space, the color and contrast enhancement, the automatic exposure control and the like. The processing time is long, such that the real-time images obtained through the camera sensor are all images delayed with 2 or more frames when being viewed by human eyes.

In the embodiment, the original image data of the camera sensing component is directly transmitted to the Mini ISP module for image processing, such that the elapsed time when the original image data have been transmitted to the display control apparatus can be reduced. In addition, functions of an ISP module are simplified to obtain the Mini ISP module, which only keeps four functions consist of the lens correction, the defective pixel correction, the noise filtering and the format conversion, thus ensuring the basic display effect and reducing the delay of image processing. Moreover, in order to ensure the display effect, the compensation ISP module is also provided, and the compensation ISP module can further process the image data on the basis of the four functions consist of the lens correction, the defective pixel correction, the noise filtering and the format conversion, so as to improve the display effect. Before the image data processing is completed by the compensation ISP module, the image data of the Mini ISP module is used for displaying, and after the image data processing is completed by the compensation ISP module, the image data of the compensation ISP module is used for displaying. In this way, the delay of image processing can be reduced without influencing visual experience of the user.

In the embodiment, the Mini ISP module, the compensation ISP module and the display control module are contained in a display driving integrated circuit (DI); the display driving integrated circuit DI can be a control processing chip based on a RISC-V (the RISC-V is an open source instruction set architecture (ISA) based on a reduced instruction set (RISC) principle compared with other instruction sets) architecture, which is referred to as a RIDI chip, but is not limited thereto. The basic hardware frame diagram is shown in FIG. 1. The core control in the architecture is the CPU micro inner core based on the RISC-V architecture, which is also the core of the whole Driver IC. This core is responsible for allocating resources in the IC. This micro inner core design can adopt a general 5-stage pipeline architecture. As shown in FIG. 2, a diagram showing the architecture of the 5-stage pipeline CPU micro inner core based on the RISC-V architecture is provided.

In FIG. 2, IF is the first stage pipeline, ID is the second stage pipeline, EX is the third stage pipeline, MEM is the fourth stage pipeline, and WB is the fifth stage pipeline.

In FIG. 2, ALU is an arithmetic logic unit, RAM is a random access memory, and ROM is a read-only memory.

In a related scheme for image processing, after the camera sensing component obtains original image data, an analog-to-digital conversion and/or an image data processing is performed on the original image data to generate RGB or YUV data. Said data is transmitted to the display control apparatus, and the display control apparatus performs a display enhancement processing on the received image data and then uses same for displaying, or converts the received image data into required display data for a direct displaying. There may be various software and hardware processing flows in the whole data link, resulting in a long transmission time and affecting the sensory experience.

In the embodiment, in addition to the common camera interface (Camera link interface, MIPI CSI interface), the display control apparatus may also include an analog data interface, which can directly receive the original image data obtained by the camera sensing component. In other words, the data obtained after the exposure of the camera sensor can be directly transmitted to the display control apparatus without any processing, for processing by the display control apparatus. In this way, the data source end can be simplified greatly, and the time delay of the image data can be further reduced.

In some embodiments, the original image data is an analog signal, the method further including:

converting, by an analog-to-digital converter, the analog signal of the original image data into a digital signal and then delivering the digital signal to the Mini ISP module and the compensation ISP module.

In the embodiment, in the Mini ISP module, only the four functions, i.e., the lens correction, the defective pixel correction, the noise filtering and the format conversion, are kept, which can reduce the time of processing image data. In addition, these four functions of the lens correction, the defective pixel correction, the noise filtering and the format conversion can be implemented in hardware, so that the processing speed can be faster and the image processing delay can be greatly reduced.

As shown in FIGS. 4 and 5, the Mini ISP module includes:
a lens correction chip, configured to perform the lens correction on the original image data;
a defective pixel correction chip, configured to perform the defective pixel correction on the original image data;
a noise filtering chip, configured to perform the noise filtering on the original image data; and
a format conversion chip, configured to perform the format conversion on the original image data.

The step of obtaining the first image data includes:
performing, by the lens correction chip, the lens correction on the original image data;
performing, by the defective pixel correction chip, the defective pixel correction on the original image data;
performing, by the noise filtering chip, the noise filtering on the original image data; and
performing, by the format conversion chip, the format conversion on the original image data.

After being processed by the four chips, the original image data can be converted into an image data format required for displaying, and can be used as display data of the display screen after a simple image scaling (zoom in or out in proportion) is performed.

In the process of image processing, the four functions of the lens correction, the defective pixel correction, the noise filtering and the format conversion can be realized by hardware. However, some other functions cannot be realized by hardware. For example, a gamut space conversion or a distortion correction cannot be realized by hardware, while the data provided by the Mini ISP module cannot meet requirements of all the application scenarios. For example, in the application scenario of digital sighting device, the data provided by the Mini ISP module is sufficient for being used by the sniper to see and lock the target for use in this apparatus scenario. However, in some other application scenarios, such as viewing-sighting device and monitoring, there is a higher requirement for image detail and quality, and the data provided by the Mini ISP module cannot meet the requirement of these application scenarios. Therefore, in the embodiment, the display control apparatus further includes the compensation ISP module, and the compensation ISP module not only has four functions of the lens correction, the defective pixel correction, the noise filtering and the format conversion, but also has other function(s). The image processing may include, but is not limited to, the following: the black level compensation, the lens correction, the defective pixel correction, the color interpolation, the Bayer (Bayer is an original image inside a camera, with "raw" as its suffix in general) noise filtering, the white balance (AWB) correction, the color correction, the gamma (gamma) correction, the color space conversion (RGB converted to YUV) on the image data, and the color noise filtering and edge enhancement on the YUV (Y is the grey scale, and U and V represent the chroma of color) color space, the color and contrast enhancement, the automatic exposure control and the like. In addition to performing steps of the lens correction, the defective pixel correction, the noise filtering and the format conversion, the compensation ISP module may also perform a first processing step such as the black level compensation, the color interpolation, the Bayer noise filtering, the white balance correction, the color correction, the gamma correction, the color space conversion, the color noise filtering and edge enhancement on the YUV color space, the color and contrast enhancement and the automatic exposure control, etc. The compensation ISP module may perform one or more first processing step(s), and the first processing step(s) required to be performed by the compensation ISP module may be determined according to the requirements of an application scenario. More first processing steps are to be performed by the compensation ISP module if there is a higher requirement for the image quality in the application scenario, and fewer first processing steps are to be performed by the compensation ISP module if there is a lower requirement for the image quality in the application scenario. In order to reduce the time taken by the compensation ISP module to perform the image processing, at least some of the first processing steps performed by the compensation ISP module may be implemented by hardware.

Further, the step of obtaining second image data includes:
obtaining, by the compensation ISP module, a calculation result which is obtained after the lens correction is performed by the Mini ISP module on the original image data, a calculation result which is obtained after the defective pixel correction is performed by the Mini ISP module, a calculation result which is obtained after the noise filtering is performed by the Mini ISP module and/or a calculation result which is obtained after the format conversion is performed by the Mini ISP module, and obtaining the second image data according to the calculation results. In this way, the compensation ISP module can perform the image processing by using the calculation results of the Mini ISP module, repeated calculations can be avoided while the time taken for performing the image processing by the compensation ISP module can be reduced.

As shown in FIG. 3, the original image data of the camera sensing component will be sent to the Mini ISP module and the compensation ISP module at the same time. Since the image processing steps performed by the Mini ISP module are less than the image processing steps performed by the compensation ISP module, and the time required for the image processing at the Mini ISP module is shorter. The Mini ISP module sends the first image data to the display control module before the compensation ISP module. After receiving the first image data, the display control module processes the first image data to obtain image data for displaying, and controls the display screen to display, so that the human eye can obtain the scene information to be observed in a timely manner. After the compensation ISP module sends the second image data to the display control module, the display control module processes the second image data to obtain image data for displaying, and controls the display screen to display, so that the human eye can observe information with more details. When a human eye sees a certain scene, only rough outline or rough information about the scene is obtained at a first time, a focusing process is done by the human eye when it is desired to observe more detailed information. During the focusing process of the human eye, the compensation ISP module can use this time duration to perform high-quality image processing. After the processing of the compensation ISP module is completed, the display control module displays, by using the second image data output by the compensation ISP module, a high-definition and high-quality image information to the human eye. In this way, a low delay can be achieved without reducing the visual experience of the user, and the compensation ISP module may even have time to do more and finer image compensation treatments.

In the embodiment, the compensation ISP module may directly obtain original image data from the camera sensing component. Optionally, the display control apparatus further includes a memory module, configured to store the original image data. The memory module can be a RAM for storage inside the display control apparatus. The original image data of the camera sensing component may be simultaneously transmitted to the Mini ISP module and the RAM for storage; and the compensation ISP module may obtain the original image data from the memory module.

In some embodiments, as shown in FIG. 1, the display control module includes:
- a data decoding module 21, configured to decode the first image data or the second image data;
- an image processing module 22, configured to process the decoded image data to obtain image data for displaying, wherein the image data for displaying matches a display mode of the display screen, for example, the resolution of the image data for displaying matches the resolution of the display screen;
- an interaction control module 23, configured to obtain control information input by a user and controlling an operation parameter of the image processing module according to the control information, wherein the interaction between the user and the display control apparatus can be realized via a key on the display control apparatus; when the user clicks the key on the display control apparatus, the operation parameter input by the user may be received;
- a camera sensor control module 24, configured to control the operation parameter of the camera sensing component, including but not limited to the exposure mode, row and column scanning mode and the like of the camera sensing component;
- a time sequence control module 25, configured to generate a driving time sequence for gate line, a gating control signal for data line and a data voltage supply control signal according to the image data for displaying, to supply the driving time sequence for gate line to a gate scanning module, to supply the gating control signal for data line to a gating circuit, and to supply the data voltage supply control signal to a data voltage supply circuit;
- the gate scanning module 26, configured to supply corresponding gate driving signals to rows of gate lines of the display screen according to the gate scanning time sequence;
- the data voltage supply circuit 27, configured to supply a data voltage to a corresponding column of data line under the control of the data voltage supply control signal; and
- the gating circuit 28, configured to control a connection between a corresponding column of data line and a data voltage receiving end of the corresponding column pixel circuit according to the gating control signal for data line, for supplying the data voltage to the corresponding column pixel circuit via the corresponding column of data line.

The display screen includes rows and columns of pixel circuits, rows of gate lines and columns of data lines. The display screen further includes a plurality of transistors, a gate electrode of a transistor may be connected to a gate line, and a first electrode or a second electrode of the transistor may be connected to the data line.

The step of controlling the display screen to display according to the image data for displaying includes:
- generating, by the time sequence control module according to the image data for displaying, the driving time sequence for gate line, the gating control signal for data line and the data voltage supply control signal, and supplying the driving time sequence for gate line to a gate scanning module, supplying the gating control signal for data line to a gating circuit, and supplying the data voltage supply control signal to a data voltage supply circuit;
- supplying, by the gate scanning module according to the gate scanning time sequence, corresponding gate driving signals to a plurality of rows of gate lines of the display screen; and
- supplying, by the data voltage supply circuit under the control of the data voltage supply control signal, a data voltage to a corresponding column of data line;
- controlling, by the gating circuit according to the gating control signal for data line, a connection between a corresponding column of data line and a data voltage receiving end of a corresponding column pixel circuit, for supplying the data voltage to the corresponding column pixel circuit via the corresponding column of data line.

In some embodiments, as shown in FIG. 1, the data decoding module 21, the image processing module 22, the interaction control module 23, the camera sensor control module 24, the time sequence control module 25, the gate scanning module 26, the data voltage supply circuit 27 and the gating circuit 28 are connected via a bus.

The data decoding module 21 may transmit decoded image data to the image processing module 22 via the bus, and the interaction control module 23 may transmit a control instruction input by a user to the camera sensor control module 24 via the bus. The image processing module 22 may transmit the image data for displaying to the time sequence control module 25 via the bus. The time sequence control module 25 may transmit the driving time sequence for gate line to the gate scanning module 26 via the bus, transmit the gating control signal for data line to the gating circuit 28 via the bus, and transmit the data voltage supply control signal to the data voltage supply circuit 27 via the bus.

As shown in FIG. 4, after the camera sensing component captures original image data, the original image data is sent to a display control apparatus via a data interface. The Mini ISP module and the ISP compensation module send the processed image data to the display control module. The display control module performs treatments such as an original image Bypass (i.e. no further processing is performed on the image data), an image zoom-in and zoom-out, an image mode switching and a menu display, and sends the image data for displaying obtained after the processing to the display screen for displaying. The camera sensor control module may perform frame synchronization with the display screen.

The display control apparatus in the embodiment may also be connected to an external processor. An intelligent processing may be performed in conjunction with the external processor. The characteristic of the RIDI chip is using only the micro inner core of the RISC-V, and the remaining part can be added according to actual needs, which has a high flexibility. Different processors can be combined, and some of the computing tasks may be handed over to the external processor(s). The RIDI chip is only responsible for an image fusion and a target locking.

In some embodiments, the method further includes:
transmitting, by an image data transmission module, first image data output by the Mini ISP module or second image data output by the compensation ISP module to an external processor, and receiving processed data returned by the processor, wherein the processed data is obtained after a specific processing is performed by the processor on the first image data or the second image data, and the specific processing includes: an image partition and/or a target object recognition.

For example, the image data transmission module may transmit the first image data output by the Mini ISP module to the external processor, and the external processor may perform comprehensive data processing on the first image data, lock feature data of a target object, and send the feature data of the target object to the display control module. Afterwards, the display control module may perform, according to the received feature data of the target object, an image segmentation, identify the target object, and lock the target object to be tracked. The image data transmission module may transmit the second image data output by the compensation ISP module to the external processor, and the external processor may perform comprehensive data processing on the second image data, lock feature data of a target object, and send the feature data of the target object to the display control module. Afterwards, the display control module may perform, according to the received feature data of the target object, an image segmentation, identify the target object, and lock the target object to be tracked.

Optionally, the image data transmission module may transmit the first image data output by the Mini ISP module to the external processor, and the external processor may perform comprehensive data processing on the first image data, calculate partition highlight data, and send the partition highlight data to the display control module. Afterwards, the display control module may fuse the partition images sent by the processor according to the received partition highlight data. The image data transmission module may transmit the second image data output by the compensation ISP module to the external processor, and the external processor may perform comprehensive data processing on the second image data, calculate partition highlight data, and send the partition highlight data to the display control module. Afterwards, the display control module may fuse the partition images sent by the processor according to the received partition highlight data.

By combining the external processor for auxiliary calculation and correction, the target can be locked at a first time, and the surrounding conditions of the target can be observed carefully, such that a low-latency, simple hardware design can be realized.

It should be noted that the various embodiments described herein are described in a progressive manner, and the same or similar parts can be referred to each other throughout the various embodiments, with each embodiment focusing on the difference from the other embodiments. In particular, the method embodiments are described in a simply manner because they are substantially similar to the product embodiments, and can be referred to the description of the product embodiments.

Unless defined otherwise, technical or scientific terms used in this disclosure shall have the ordinary meaning as understood by one of ordinary skill in the art to which this disclosure belongs. The use of "first", "second", and the like in this disclosure does not denote any order, quantity, or importance, but rather is used to distinguish one element from another. The word "include" or "comprise", and the like, means that the presence of an element or item preceding the word covers the presence of the element or item listed after the word and equivalents thereof, but does not exclude other elements or items. The terms "connect" or "link" and the like are not limited to a physical or mechanical connection, but may also be an electrical connection, whether direct or indirect. The terms "upper", "lower", "left", "right" and the like are used only to indicate relative positional relationships that may change accordingly when the absolute position of the object being described changes.

It will be understood that when an element such as a layer, film, region or substrate is referred to as being "on" or "under" another element, it can be "directly on" or "directly under" the other element or intervening elements may be present.

In the description of the embodiments, particular features, structures, materials, or characteristics may be combined in any suitable manner in one or more embodiments or examples.

The foregoing is only a detailed description of the present disclosure, but the protection scope of the present disclosure is not limited thereto. Any change or substitution that can be easily contemplated by those skilled in the art without departing from the spirits of this disclosure falls within the scope of the present disclosure. Accordingly, the protection scope of the present disclosure is set forth in the appended set of claims.

What is claimed is:
1. A display control apparatus, comprising:
a display control circuit;
a hardware-implemented Mini image signal processing (ISP) processor, configured to:
  obtain original image data of a camera sensing component in real time,
  obtain first image data by performing exactly four operations on the original image data, the four operations consisting of a lens correction, a defective pixel correction, a noise filtering and a format conversion, and
  send the first image data to a display control circuit; and
a compensation ISP processor, configured to obtain second image data by performing a lens correction, a defective pixel correction, a noise filtering, a format conversion and a first processing step on the original image data, and to send the second image data to the display control circuit; wherein,
the display control circuit is configured to:
  process the first image data to obtain first image data for displaying before receiving the second image data, and control a display screen to display according to the first image data for displaying; and
  process the second image data to obtain second image data for displaying after receiving the second image data, and control the display screen to display according to the second image data for displaying;
wherein the first processing step comprises at least one of:
  a black level compensation, a color interpolation, a Bayer noise filtering, a white balance correction, a color correction, a gamma correction, a color space conversion, a color noise filtering and edge enhancement in YUV color space, a color and contrast enhancement, or an automatic exposure control.

2. The display control apparatus according to claim 1, wherein,
the compensation ISP processor is further configured to obtain a calculation result which is obtained after the lens correction is performed by the Mini ISP processor on the original image data, a calculation result which is obtained after the defective pixel correction is performed by the Mini ISP processor, a calculation result which is obtained after the noise filtering is performed by the Mini ISP processor and/or a calculation result which is obtained after the format conversion is performed by the Mini ISP processor, and to obtain the second image data according to the calculation results.

3. The display control apparatus according to claim 1, wherein the Mini ISP processor comprises:
a lens correction chip, configured to perform the lens correction on the original image data;
a defective pixel correction chip, configured to perform the defective pixel correction on the original image data;
a noise filtering chip, configured to perform the noise filtering on the original image data; and
a format conversion chip, configured to perform the format conversion on the original image data.

4. The display control apparatus according to claim 1, wherein the display control circuit comprises:
a data decoding circuit, configured to decode the first image data or the second image data;
an image processing circuit, configured to process the decoded image data to obtain image data for displaying comprising the first image data for displaying or the second image data for displaying, wherein the image data for displaying matches a display mode of the display screen;
an interaction control circuit, configured to obtain control information input by a user and to control an operation parameter of the image processing circuit according to the control information;
a camera sensor control circuit, configured to control an operation parameter of the camera sensing component;
a time sequence control circuit, configured to generate a driving time sequence for gate line, a gating control signal for data line and a data voltage supply control signal according to the image data for displaying, to supply the driving time sequence for gate line to a gate scanning circuit, to supply the gating control signal for data line to a gating circuit, and to supply the data voltage supply control signal to a data voltage supply circuit;
the gate scanning circuit, configured to supply corresponding gate driving signals to a plurality of rows of gate lines of the display screen according to the driving time sequence for gate line;
the data voltage supply circuit, configured to supply a data voltage to a corresponding column of data line under the control of the data voltage supply control signal; and
the gating circuit, configured to control a connection between a corresponding column of data line and a data voltage receiving end of a corresponding column pixel circuit according to the gating control signal for data line, for supplying the data voltage to the corresponding column pixel circuit via the corresponding column of data line.

5. The display control apparatus according to claim 4, wherein,
the data decoding circuit, the image processing circuit, the interaction control circuit, the camera sensor control circuit, the time sequence control circuit, the gate scanning circuit, the data voltage supply circuit and the gating circuit are connected via a bus.

6. The display control apparatus according to claim 1, further comprising:
an image data transmission circuit, configured to transmit the first image data output by the Mini ISP processor or the second image data output by the compensation ISP processor to an external processor, and to receive processed data returned by the processor, wherein the processed data is obtained after a specific processing is performed by the processor on the first image data or the second image data, and the specific processing comprises: an image partition and/or a target object recognition.

7. The display control apparatus according to claim 1, wherein the original image data is an analog signal, the display control apparatus further comprises:
an analog-to-digital converter, configured to convert the analog signal of the original image data into a digital signal and then deliver the digital signal to the Mini ISP processor and the compensation ISP processor.

8. The display control apparatus according to claim 1, further comprising:
a memory configured to store the original image data;
wherein the compensation ISP processor is further configured to obtain the original image data from the memory.

9. The display control apparatus according to claim 1, wherein the Mini ISP processor, the compensation ISP processor and the display control circuit are included in a control processing chip based on a RISC-V architecture.

10. A display device, comprising a display control apparatus wherein the display control apparatus comprises:
a display control circuit;
a hardware-implemented Mini image signal processing (ISP) processor, configured to:
obtain original image data of a camera sensing component in real time,
obtain first image data by performing exactly four operations on the original image data, the four operations consisting of a lens correction, a defective pixel correction, a noise filtering and a format conversion, and
send the first image data to a display control circuit; and
a compensation ISP processor, configured to obtain second image data by performing a lens correction, a defective pixel correction, a noise filtering, a format conversion and a first processing step on the original image data, and to send the second image data to the display control circuit; wherein,
the display control circuit is configured to:
process the first image data to obtain first image data for displaying before receiving the second image data, and control a display screen to display according to the first image data for displaying; and
process the second image data to obtain second image data for displaying after receiving the second image data, and control the display screen to display according to the second image data for displaying;
wherein the first processing step comprises at least one of:
a black level compensation, a color interpolation, a Bayer noise filtering, a white balance correction, a color correction, a gamma correction, a color space conversion, a color noise filtering and edge enhancement in YUV color space, a color and contrast enhancement, or an automatic exposure control; and wherein the display device further comprises a display screen, and the display screen comprises a plurality of rows of pixel circuits and a plurality of columns of pixel circuits, a plurality of rows of gate lines and a plurality of columns of data lines.

11. The display device according to claim 10, wherein the display device is an optical sighting device or a virtual reality VR helmet.

12. The display device according to claim 10, wherein the compensation ISP processor is further configured to obtain a calculation result which is obtained after the lens correction is performed by the Mini ISP processor on the original image data, a calculation result which is obtained after the defective pixel correction is performed by the Mini ISP processor, a calculation result which is obtained after the noise filtering is performed by the Mini ISP processor and/or a calculation result which is obtained after the format conversion is performed by the Mini ISP processor, and to obtain the second image data according to the calculation results.

13. The display device according to claim 10, wherein the display control apparatus further comprises:
an image data transmission circuit, configured to transmit the first image data output by the Mini ISP processor or the second image data output by the compensation ISP processor to an external processor, and to receive processed data returned by the processor, wherein the processed data is obtained after a specific processing is performed by the processor on the first image data or the second image data, and the specific processing comprises: an image partition and/or a target object recognition.

14. A display control method, performed by a display control apparatus, comprising:
obtaining, by a hardware-implemented Mini image signal processing ISP processor, original image data of a camera sensing component in real time;
obtaining, by the Mini ISP processor, first image data by performing exactly four operations on the original image data, the four operations consisting of a lens correction, a defective pixel correction, a noise filtering and a format conversion;
sending, by the Mini ISP processor, the first image data to a display control circuit;
obtaining, by a compensation ISP processor, second image data by performing a lens correction, a defective pixel correction, a noise filtering, a format conversion and a first processing step on the original image data;
sending, by the compensation ISP processor, the second image data to the display control circuit;
processing, by the display control circuit, the first image data to obtain first image data for displaying before receiving the second image data;
controlling, by the display control circuit, a display screen to display according to the first image data for displaying;
processing, by the display control circuit, the second image data to obtain second image data for displaying after receiving the second image data, and controlling, by the display control circuit, the display screen to display according to the second image data for displaying;
wherein the first processing step comprises at least one of: a black level compensation, a color interpolation, a Bayer noise filtering, a white balance correction, a color correction, a gamma correction, a color space conversion, a color noise filtering and edge enhancement in YUV color space, a color and contrast enhancement, or an automatic exposure control.

15. The display control method according to claim 14, wherein the obtaining second image data comprises:
obtaining, by the compensation ISP processor, a calculation result which is obtained after the lens correction is performed by the Mini ISP processor on the original image data, a calculation result which is obtained after the defective pixel correction is performed, a calculation result which is obtained after the noise filtering is performed and/or a calculation result which is obtained after the format conversion is performed, and obtaining the second image data according to the calculation results.

16. The display control method according to claim 14, wherein the obtaining first image data comprises:
performing, by a lens correction chip comprised in the Mini ISP processor, the lens correction on the original image data;
performing, by a defective pixel correction chip comprised in the Mini ISP processor, the defective pixel correction on the original image data;
performing, by a noise filtering chip comprised in the Mini ISP processor, the noise filtering on the original image data; and
performing, by a format conversion chip comprised in the Mini ISP processor, the format conversion on the original image data.

17. The display control method according to claim 14, wherein the controlling the display screen to display according to the first or second image data for displaying comprises:
generating, by a time sequence control circuit according to the first or second image data for displaying, a driving time sequence for gate line, a gating control signal for data line and a data voltage supply control signal, supplying the driving time sequence for gate line to a gate scanning circuit, supplying the gating control signal for data line to a gating circuit, and supplying the data voltage supply control signal to a data voltage supply circuit;
supplying, by the gate scanning circuit according to the driving time sequence for gate line, corresponding gate driving signals to a plurality of rows of gate lines of the display screen;
supplying, by the data voltage supply circuit under the control of the data voltage supply control signal, a data voltage to a corresponding column of data line;
controlling, by the gating circuit according to the gating control signal for data line, a connection between a corresponding column of data line and a data voltage receiving end of a corresponding column pixel circuit, for supplying the data voltage to the corresponding column pixel circuit via the corresponding column of data line.

18. The display control method according to claim 14, further comprising:
transmitting, by an image data transmission circuit, first image data output by the Mini ISP processor or second image data output by the compensation ISP processor to an external processor, and receiving processed data returned by the processor, wherein the processed data is obtained after a specific processing is performed by the processor on the first image data or the second image data, and the specific processing comprises: an image partition and/or a target object recognition.

19. The display control method according to claim 14, further comprising:
converting, by an analog-to-digital converter, an analog signal of the original image data into a digital signal, and delivering the digital signal to the Mini ISP processor and the compensation ISP processor.

20. The display control method according to claim 14, further comprising:
storing, by a memory, the original image data; and
obtaining, by the compensation ISP processor, the original image data from the memory.

\* \* \* \* \*